April 24, 1934.  A. B. MULLIN  1,956,331
BUFFING MACHINE
Filed Nov. 26, 1932  4 Sheets-Sheet 1

INVENTOR
ANDREW B. MULLIN
BY Ely & Barrow
ATTORNEYS

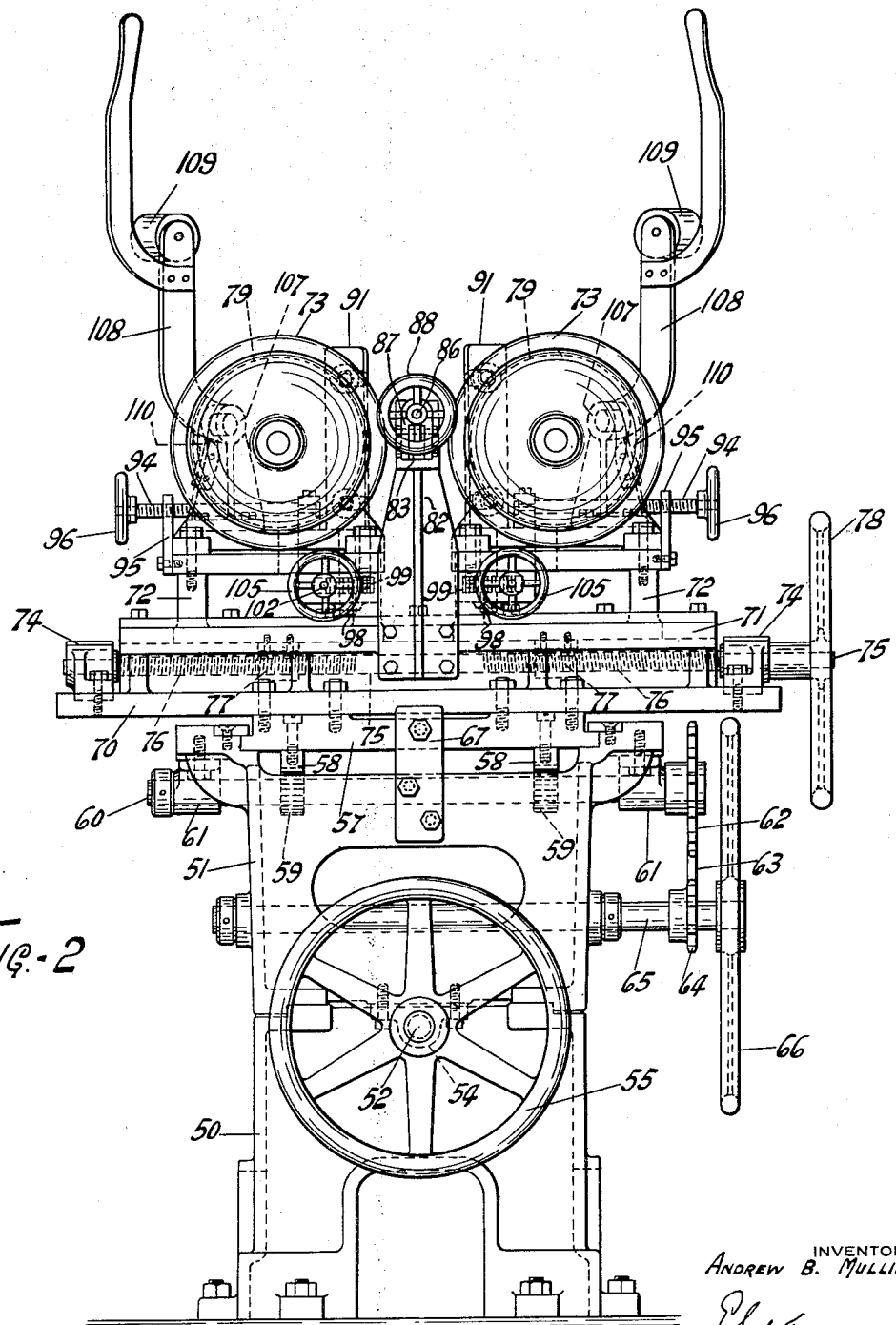

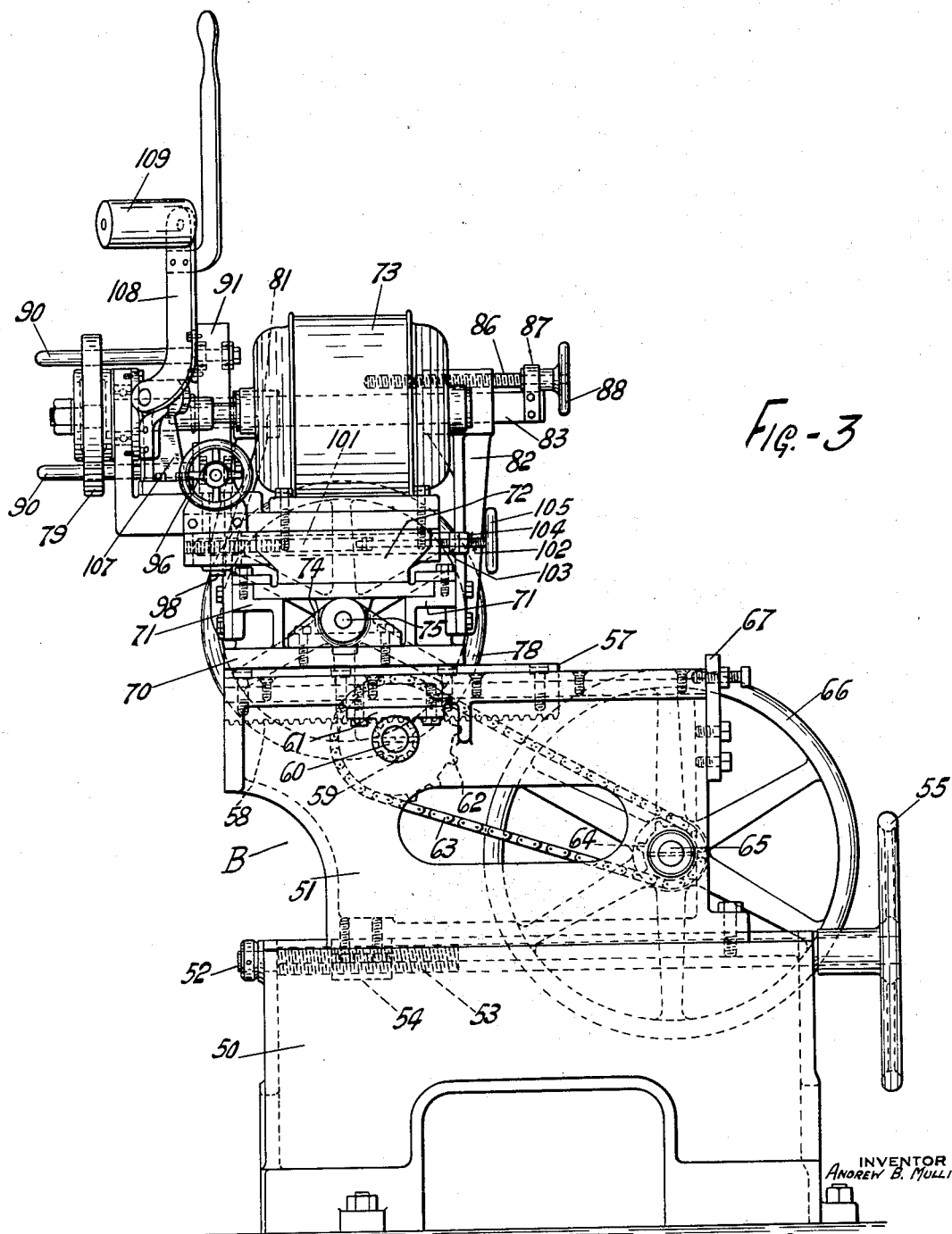

April 24, 1934.　　　　　A. B. MULLIN　　　　　1,956,331
BUFFING MACHINE
Filed Nov. 26, 1932　　　4 Sheets-Sheet 4
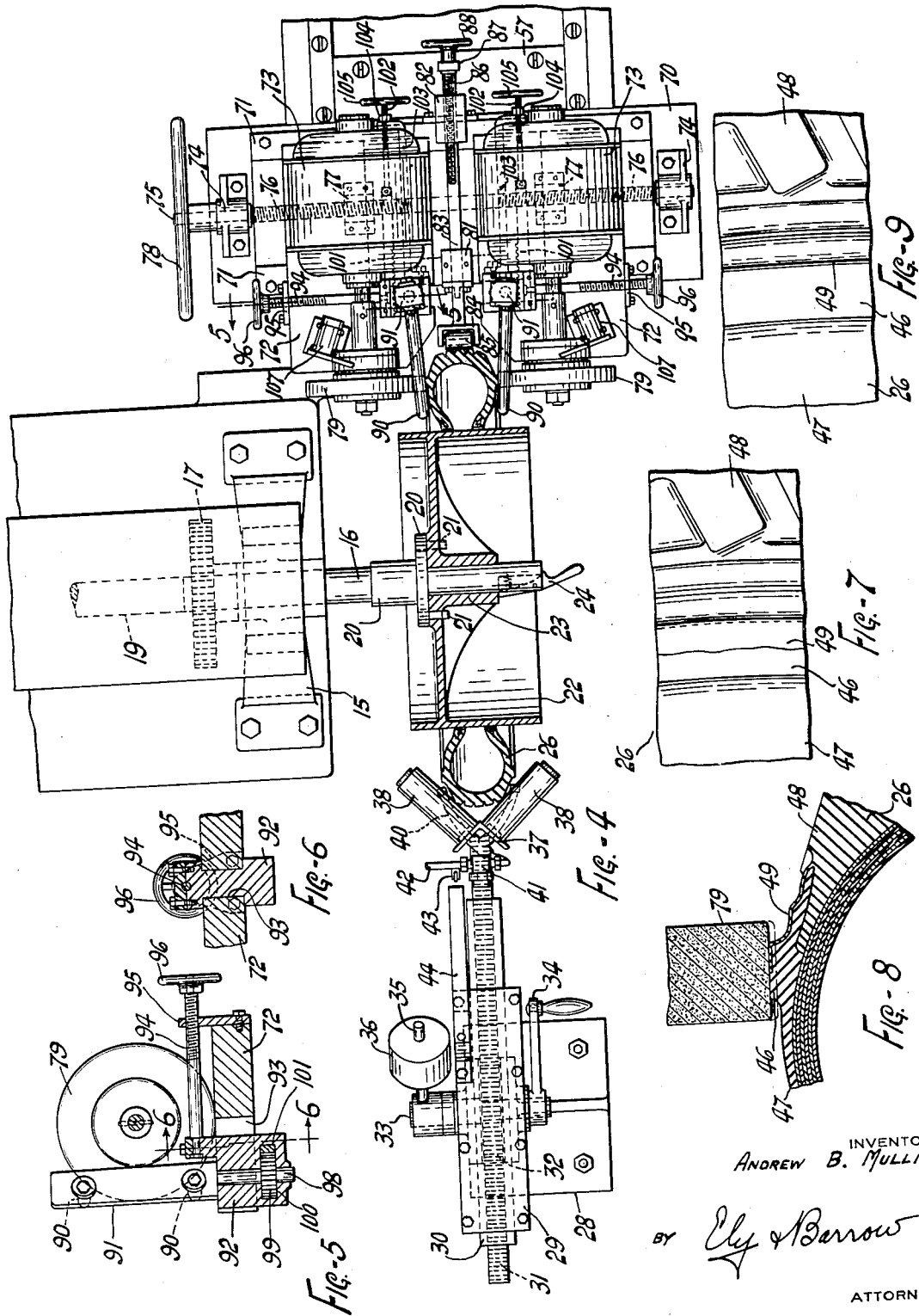
INVENTOR
ANDREW B. MULLIN
BY Ely & Barrow
ATTORNEYS Patented Apr. 24, 1934

1,956,331

UNITED STATES PATENT OFFICE 1,956,331

BUFFING MACHINE

Andrew B. Mullin, Akron, Ohio, assignor to The Firestone Tire & Rubber Company, Akron, Ohio, a corporation of Ohio Application November 26, 1932, Serial No. 644,425

5 Claims. (Cl. 51—89)

This invention relates to buffing machines, and more especially it relates to machines for buffing local circumferential regions of the sidewalls of pneumatic tire casings.

The invention is of primary utility in the manufacture of tires made from rubber stocks of more than one color, for concurrently grinding down ribs or beads on opposite sides of the tires, in which ribs the different colored tire stocks meet, thereby uncovering a sharply-defined, circumferential juncture of the differently colored stocks.

The chief object of the invention is to provide an improved machine for economically buffing local regions on opposite sides of a pneumatic tire casing. More specifically the invention aims to provide a machine adapted to buff tires of a wide range of sizes; and to provide improved mechanism for presenting the tire to the abrading means so that uniformity of abrasion automatically is effected. Other objects will be manifest.

Of the accompanying drawings:

Figure 2 is an end elevation of the machine, on a larger scale, in inoperative position, as viewed from the right of Figure 1;

Figure 3 is a side elevation of a part of the machine shown in Figure 1, on a larger scale, in inoperative position;

Figure 4 is a plan view of the machine shown in Figure 1, a part thereof being broken away and a part, including the work, being in section;

Figure 5 is a section on the line 5—5 of Figure 4;

Figure 6 is a section on the line 6—6 of Figure 5;

Figure 7 is a fragmentary side elevation of a two color tire, showing the juncture of two differently colored rubber stocks before the buffing operation;

Figure 8 is a fragmentary section through the work and a buffer during a tire-buffing operation; and Figure 9 is a view similar to Figure 7 showing a tire as it appears after a buffing operation.

Figure 1:
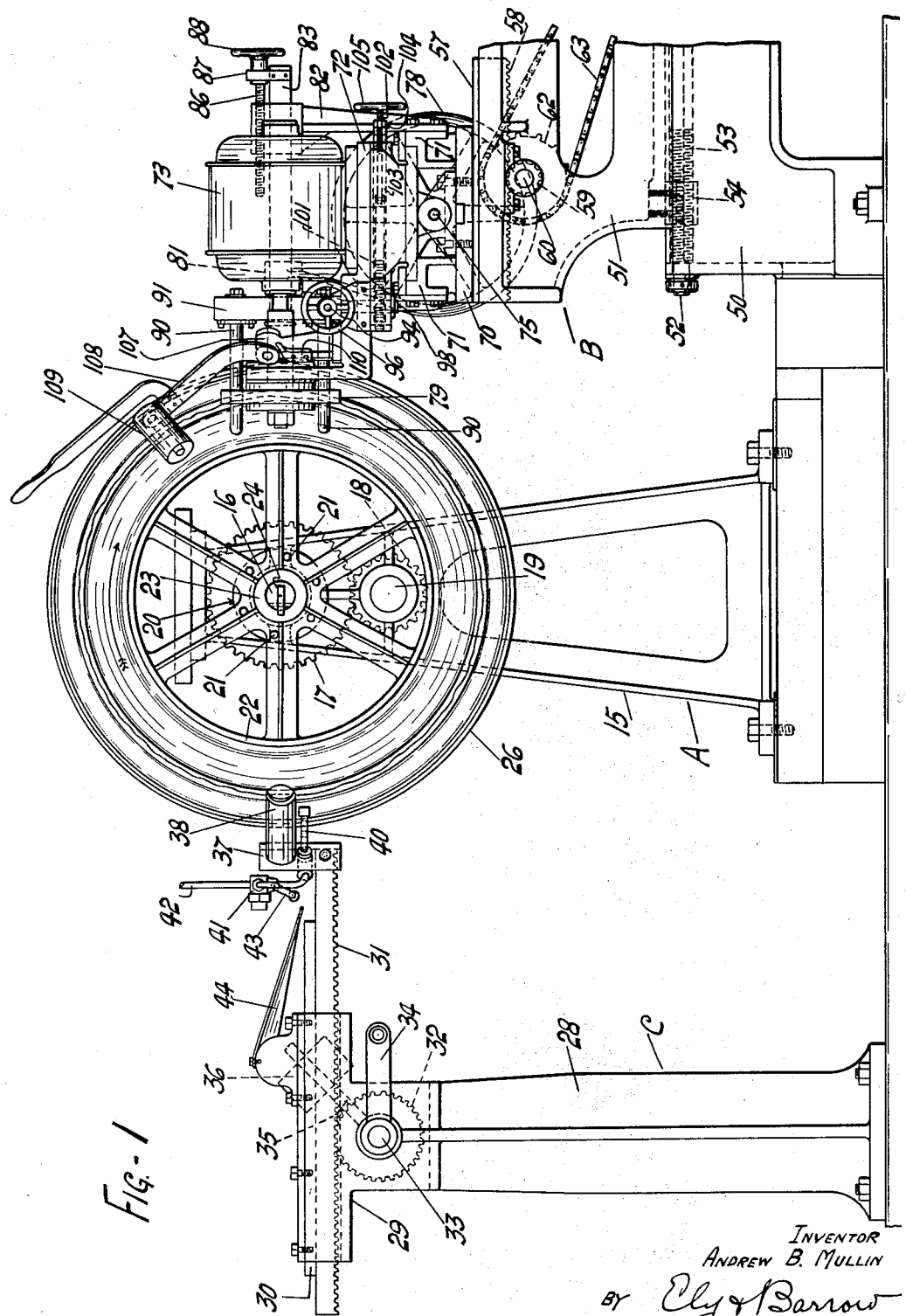
Figure 1 is a side elevation of a machine embodying the invention, in its preferred form, in operative position, and a two-colored tire therein, a part of the machine, at the extreme right thereof being broken away.

Referring especially to Figure 1 of the drawings, it will be seen that the improved buffing machine consists of three units, namely, a tire-supporting and driving unit, designated A, a buffing unit B for concurrently buffing local circumferential regions on opposite sides of a tire, and a unit C that guides the tire during the driving thereof, and removes particles of rubber that adhere to the tire after a buffer has passed thereover.

The unit A comprises a suitable standard or bracket 15, the upper portion of which is formed with a bearing for a rotatable horizontal spindle 16, the latter having one end portion thereof provided with a gear 17 that is meshed with a pinion 18 on a drive-shaft 19 that is driven from any suitable source of power (not shown). The spindle 16 projects or overhangs forwardly of the standard 15 and has a collar 20 mounted upon said overhanging portion, which collar is provided with two or more forwardly extending studs or dowels 21, 21. A cylindrical drum 22 mounted upon spindle 16 in front of collar 20 has its hub portion 23 formed with suitable recesses or apertures in which the dowels 21 seat for providing driving connection between the spindle and drum.

A spring-pressed latch 24 in the front end portion of the spindle 16 is provided for preventing axial movement of the drum 22 on spindle 16, yet permitting the drum to be easily and quickly removed from the spindle when desired. The drum 22 is adapted to support and drive a tire 26 to be buffed, the tire preferably having an easy sliding fit on the drum. Respective drums are provided for tires of different inside diameters.

The unit C comprises a standard 28 upon the top of which is mounted a bracket 29 in which a slide 30 is mounted for longitudinal movement toward and away from drum 22. The bottom face of the slide 30 is formed with rack teeth 31 that mesh with a pinion 32 mounted upon a shaft 33 that is journaled in bracket 29. One end of shaft 33 is provided with an operating handle 34, and the other end carries an arm 35 on which is mounted a counterweight 36, the arm 35 being so angularly positioned that the counterweight 36 moves over center to one side of shaft 33 when the slide 30 is moved toward the drum 22, and moves over center to the other side of said shaft when the slide moves away from said drum. The arrangement is such that the counterweight normally holds the slide 30 in retracted position, or urges it yieldingly toward the drum 22.

Upon the end portion of the slide 30 nearest the drum 22 is mounted an angular bracket 37 that carries a pair of rotatably mounted guide-rollers 38, 38 that are disposed at right angles to each other, in a horizontal plane. The guide-rollers 38 are adapted to embrace the tire 26, as is most clearly shown in Figure 4, to determinately position the said tire axially of the drum 22, and to urge the tire against the drum so as to assure good frictional engagement therewith, for rotating the tire.

In order to remove dust and comminuted rubber from the sidewalls of the tire 26, as the latter is buffed, an arcuate, U-shaped fluid-delivery nozzle 40 is mounted upon the slide 30, said nozzle being supported by the bracket 37, and adapted to embrace both sides of the tire 26 so as to direct pressure fluid, preferably air, against the sidewalls of said tire.

The nozzle 40 is connected to a valve 41 that is carried by slide 30, and pressure fluid is delivered to said valve through a flexible conduit 42 extending to a source of pressure fluid (not shown). The valve 41 is controlled by an operating lever 43, the weight of the latter being such as normally to open the valve, which it does when the nozzle 40 is positioned adjacent a tire. For closing the valve 41, a stationary inclined plane or cam 44 is mounted upon the top of bracket 29, and so positioned as to engage and lift lever 43 to close valve 41 when the slide 30 is moved away from the drum 22, which is to the left as viewed in Figures 1 and 4. Thus the nozzle 40 automatically delivers air to clean a tire when slide 30 is in operative position.

The regions of tire 26 that are to be buffed or abraded are best illustrated in Figures 7, 8, and 9, wherein one of said regions is shown, said region consisting of a flat, circumferential rib or bead 46 formed on the sidewall of the tire. As is shown in Figure 8, the bead 46 is composed mainly of sidewall stock, which stock is of contrasting color to that of the tread of the tire. The ordinary combination is to have a white sidewall 47 and black tread 48. In the manufacture of the tire a thin layer 49 of black rubber is extended from the tread stock 48, over the adjacent marginal portion of the white sidewall stock 47, to the surface region of the bead 46. During vulcanization, flow of the rubber stocks produces a very irregular margin of the layer 49 on bead 46, as is clearly shown in Figure 7. By abrading the surface of bead 46, the thin overlying portion of layer 49 may be removed, so that the margin of layer 49, along the edge of bead 46, will be regular and concentric with the axis of the tire, as is shown in Figure 9.

Referring now to unit B of the machine, there is provided a base-casting 50 that is disposed on the opposite side of drum 22 from the unit C, and preferably is centrally aligned with slide 30 of the latter. The top of base casting 50 is provided with a slideway for a carriage 51 that is mounted thereon, the carriage being movable from and toward drum 22.

For so moving carriage 51, a shaft 52 is journaled in opposite ends of base-casting 50 and formed with a screw thread 53 that is engaged by a nut 54 mounted upon the bottom of said carriage. One end of shaft 52 extends from the base casting and is provided with a hand-wheel 55 for manual operation.

The top of carriage 51 is formed with a slideway for a slide 57 that is movable toward and from the drum 22. The bottom of slide 57 is provided, on opposite sides of its center line, with a pair of downwardly facing racks 58, 58, Figure 2, that mesh with respective pinions 59, 59 that are mounted upon a shaft 60 that is journaled at its ends in brackets 61, 61 secured to the carriage 51 at opposite sides thereof. The shaft 60 projects from the far side of carriage 51 and is provided thereat with a sprocket 62 that is connected by a sprocket chain 63 to a sprocket 64 mounted up a shaft 65 that also is journaled in carriage 51. The shaft 65 is provided with a hand-wheel 66 by which it is manually turned to move the slide 57 toward or away from the drum 22. An adjustable stop member 67 is mounted upon the carriage 51 in position to limit the movement of the slide 57 away from the drum, the work limiting its movement toward the drum as subsequently will be explained.

The slide 57 carries a rectangular table 70 having its long dimension transverse to the direction of movement of the said slide. The top of the table 70 is formed with a pair of elevated, longitudinally extending slideways 71, 71 upon which are mounted a pair of slides 72, 72, each of which carries an electric motor 73. At opposite ends of the table 70, between slideways 71, are respective journal brackets 74, 74 that carry a shaft 75 beneath slides 72, said shaft being formed with right-hand and left-hand screw threads 76, 76 that are engaged by respective nuts 77 mounted upon the under side of said slides 72. One end of shaft 75 extends beyond table 70 and is provided thereat with a hand-wheel 78 by which the shaft is manually turned to move the motors 73 from and toward each other.

The slides 72 and motors 73 are disposed equidistant from the center of the table 70, which center is aligned with the center line of slide 30. The shaft of each motor 73 extends toward the drum 22 and is provided with an abrading wheel 79.

Mounted upon the slideway 71 nearest the drum 22, between the slides 72, is an upstanding bracket 81, and a somewhat similar bracket 82 is similarly mounted upon the other slideway 71. The brackets 81, 82 slidably support a horizontal bar 83 of square or rectangular section, and the end of said bar nearest the drum 22 is formed with a yoke or fork 84, (Figure 4) in which a guide-roller 85 is journaled on a horizontal axis. The axes of the guide-rollers 38, drum 22, and guide-roller 85 are in the same horizontal plane. For adjusting the bar 83 longitudinally to vary the position of guide-roller 85, a screw 86 is threaded through bracket 82 above the bar 83, and connected to the latter by a suitable collar 87. The screw 86 is provided with a hand-wheel 88 by which it is turned to adjust the bar 83.

In order to assure that the sidewalls of the tire 26 will be presented properly to the abrading wheels 79, and to determine the depth to which the beads 46 of the tire will be abraded, a pair of relatively long and narrow guide-rollers 90, 90 is associated with each abrading wheel 79, and so positioned as to engage the beads 46 of the tire above and below the point where said beads are engaged by said abrading wheels. Thus the guide-rollers 90 control the position of the sidewalls of the tire with relation to the abrading wheels.

Each pair of guide-rollers 90 is adjustable as a unit laterally toward and/or away from the medial vertical plane of the tire, so as properly to engage tires of various sizes, and also is adjustable angularly with relation to the plane of the tire. To this end the rollers 90 of each pair of rollers are journaled at one end upon an upstanding post or carrier 91 that is swiveled upon a slide 92 that is mounted in a slot 93 in the slide 72, as is most clearly shown in Figures 4, 5, and 6.

Pivotally connected to a suitable lug formed on slide 92 is a shaft 94 that has its end remote from the slide threaded through a bracket 95 mounted upon said slide 72, the free end of said shaft being provided with a hand-wheel 96 by which the shaft is manually turned to move the slide 92 in slot 93.

The post 91 is swiveled on slide 92 by means of a vertical stem 98 that is journaled in said slide, said stem having a pinion 99 mounted thereon in a slot 100 that extends transversely through said slide. The pinion 99 is meshed with a rack 101 that also is mounted in slot 100. In moving the rack 101 longitudinally to turn the post 91, one end of said rack is pivotally connected to one end of a rod or shaft 102 that has its other end threaded and extended through an aperture in an elongate bracket 103 that is carried by the slide 92. A lock-nut 104 may be provided on shaft 102 for adjusting its position in bracket 103, and a hand-wheel 105 may be provided on the end of said shaft for facilitating the longitudinal adjustment thereof. It will be understood that both pairs of guide-rollers 90 are provided with operating means such as that described.

When the tires 26 are uniformly constructed, the machine as described, when properly adjusted, will uniformly abrade the beads 46 on the sidewalls of the tires. However, it sometimes happens that there are irregularities in the tires such that in the ordinary buffing operation not all of the layer 49 is removed from local regions of the sidewall ribs 46. To meet this condition, a bracket 107 is mounted upon each slide 72, and pivotally mounted upon each of said brackets is a lever arm 108 that carries a presser roller 109, the bracket 107 being so angularly positioned that the roller 109 may be moved into engagement with a side of the tire 26, as is most clearly shown in Figure 1. By urging a roller 109 against the side of a tire, the opposite side of the tire may be pressed more strongly against the abrading wheel 79, whereby local regions of the tire may be more deeply abraded. A stop or rest 110 may be provided on each bracket 107 for supporting the lever arms 108 in erect position, as shown in Figures 2 and 3, when they are not in use.

In the inoperative position of the apparatus, the slide 30 is positioned to the left of where it appears in Figure 1, and the valve 41 is closed by the cam 44 so that no air is delivered from nozzle 40. The lever arms 107 are in erect position and the slide 57 is disposed to the right of the position in which it is shown in Figures 1, 3 and 4. The slides 71 and 92 previously have been properly adjusted so that the abrading wheels 79 and guide-rollers 90 are in position properly to engage a tire. The motors 73 and drum 22 preferably are constantly driven, the latter at relatively slow speed.

In the operation of the machine, a tire 26 is placed upon the rotating drum 22, and the lever 34 is thrown over to move the slide 30 toward the drum, with the result that guide-rollers 38 engage the tire and determinately position it, and urge it into good frictional driving engagement with said drum. The movement of slide 30 also causes valve 41 to open so that air under pressure is directed against the sidewalls of the tire by nozzle 40. The hand-wheel 66 is then turned to move the slide 57 and mechanisms thereon toward the drum whereby the guide-rollers 90 and abrading wheels 79 are brought into engagement with the ribs 46 on the sidewalls of the tire 26. Thus the ribs 46 are abraded to a sufficient depth to remove all traces of the layer 49 therefrom.

The proper positioning of the slide 57 with relation to the work may be determined by the roller 85 which ordinarily need just touch the tire without exerting pressure thereagainst. In some cases however, the tire may be so thin or flexible as to elongate radially and not bear firmly enough against the abrading wheels to be properly buffed. In this case the roller 85, by exerting radial pressure against the perimeter of the tire, in the region being buffed, will counteract the radial elongation and thereby assure adequate abrading of the tire.

The machine is adapted to buff tires of a wide range of sizes, is relatively simple in operation, and achieves the several advantages set out in the foregoing statement of objects.

Modification may be resorted to without departing from the spirit of the invention or the scope of the appended claims, which are not limited wholly to the specific construction shown and described.

What is claimed is:

1. In a buffing machine for tires, the combination of a cylindrical rotatable drum upon which the tire may be loosely mounted for supporting and rotating the tire, a slide disposed laterally of the drum, tire-engaging means on the slide, means for moving the slide radially of the drum so that the tire-engaging means on the slide determinately positions the tire on the drum, and tire abrading means disposed laterally of the drum, diametrically opposite the tire-positioning means.

2. A combination as defined in claim 1 including a fluid-delivery nozzle of the slide, and means for delivering fluid therefrom controlled by movement of the slide.

3. In apparatus for buffing tires, the combination of means for supporting and rotating a tire, a pair of slides on opposite sides of the plane of the tire movable radially of the tire, an abrading device on each slide adapted to be moved into engagement with the sidewalls of the tire by movement of the slides, a pair of guide-rollers carried by each slide and cooperating with the respective abrading devices for limiting the cutting action of the latter, and means for adjusting each pair of guide-rollers on its slide, as a unit, laterally of the abrading device.

4. In apparatus for buffing tires, the combination of means for supporting and rotating a tire, a pair of opposed abrading devices on opposite sides of the tire adapted to be pressed against the respective sidewalls thereof to abrade the same, and means for preventing radial elongation of the tire under the abrading pressure.

5. In apparatus for buffing tires, the combination of means for supporting and rotating a tire, a slide movable radially of the tire, a pair of abrading devices mounted upon said slide, on opposite sides of the plane of the tire, adapted to be moved into and out of engagement with the sidewalls of the tire by movement of said slide, and a roller on said slide, between the abrading devices, adapted to engage the outer periphery of the tire during a tire-abrading operation.

ANDREW B. MULLIN.